April 5, 1949.  W. O. CURTIS, JR  2,466,387
METHOD OF SEALING THE ENDS OF DUPLEX INSULATED
WEBS IN ROLL FORM AND PRODUCT THEREOF
Filed Nov. 11, 1943
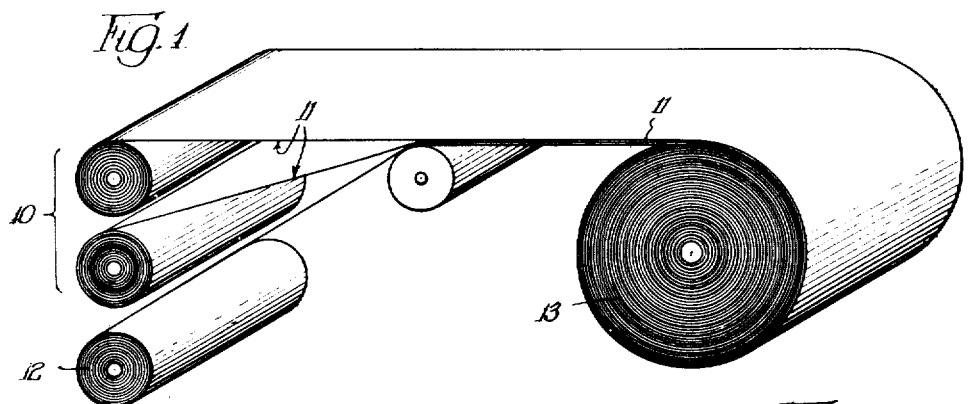
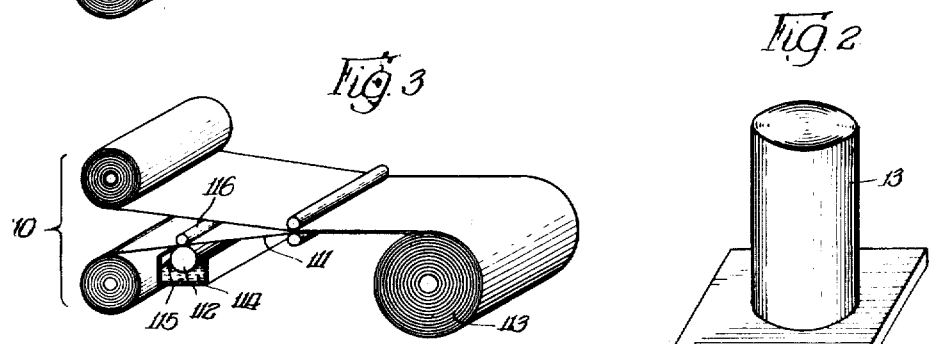
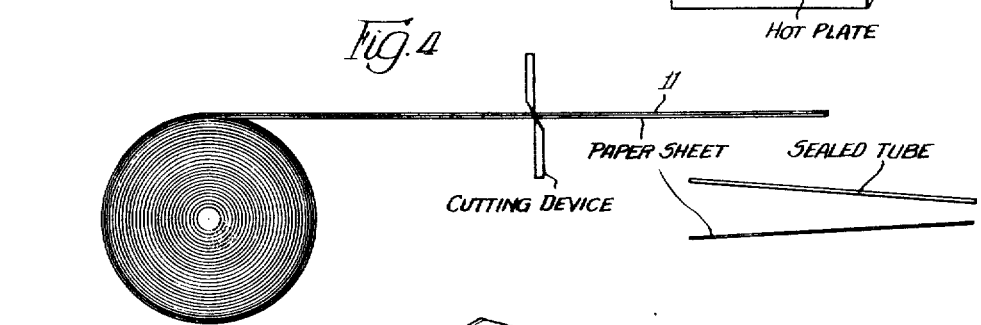
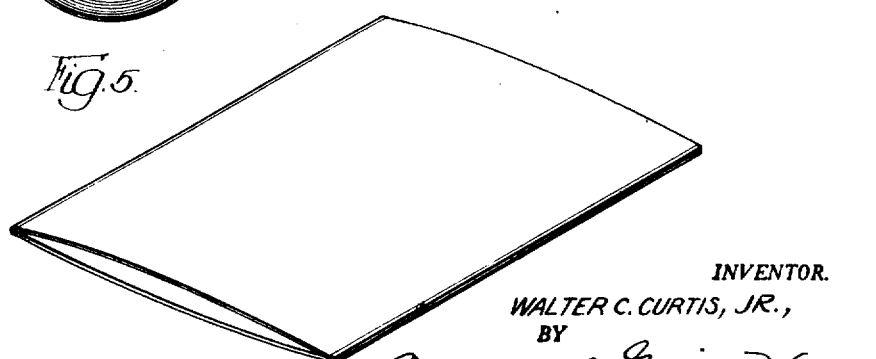
INVENTOR.
WALTER C. CURTIS, JR.,
BY
Cromwell, Greist & Warden
ATTYS Patented Apr. 5, 1949

2,466,387

UNITED STATES PATENT OFFICE 2,466,387

METHOD OF SEALING THE ENDS OF DUPLEX INSULATED WEBS IN ROLL FORM, AND PRODUCT THEREOF

Walter C. Curtis, Jr., Pittsburgh, Pa., assignor, by mesne assignments, to Shellmar Products Corporation, Mount Vernon, Ohio, a corporation of Delaware Application November 11, 1943, Serial No. 509,921

8 Claims. (Cl. 154—116)

This invention relates to the fabrication of sheet material. More particularly, it pertains to a novel bulk sealing method in which a duplex web of heat-sealable material is gathered in bulk form, each layer of the duplex web being insulated from the other, the ends of the mass being sealed to fuse together contacting marginal portions of the duplex web, and the provision of such a product and method for its manufacture is a principal object of the invention.

More specifically, it is an object of the invention to provide a novel bulk sealed product and a method for producing the same by running a web of non-heat-sealable material against one sheet of a duplex web of heat-sealable material, collecting all of the sheets by continuously winding them together into roll form, and heat-sealing the ends of the rolls so as marginally to fuse together the sheets of heat-sealable material where they are in face-to-face contact with each other.

Another object of the invention is the provision of a roll of sheet material bulk sealed at its ends and which, upon unwinding, can be cut into tubes and formed into containers.

Other objects of the invention will in part be obvious and will in part appear hereinafter.

The invention accordingly comprises the several steps and the relation of one or more of such steps with respect to each of the others, and the article possessing the features, properties and the relation of elements, which are exemplified in the following detailed disclosure, and the scope of the application of which will be indicated in the claims.

For a fuller understanding of the nature and objects of the invention reference should be had to the following detailed description taken in connection with the accompanying drawing, in which:

Fig. 1 is a diagrammatic illustration, in perspective, depicting a preferred method of preparing a mill roll for bulk sealing the ends;

Fig. 2 is a perspective view illustrating one method of heat-sealing the ends of a mill roll such as that shown in Fig. 1;

Fig. 3 is a perspective view diagrammatically illustrating a modified method of preparing a mill roll for bulk sealing the ends;

Fig. 4 diagrammatically illustrates a method of unwinding a mill roll and cutting the web into lengths to provide tubes to be made in containers; and Fig. 5 is a perspective view further showing one of the cut tubes illustrated in Fig. 4.

Referring more particularly to the drawing, two rolls 10 of seat-sealable material, such as Pliofilm, Saran or the like, are run together to form a duplex web 11. Simultaneously with the formation of the duplex web, a web from another roll 12 of non-heat-sealable material such as, for example, paper, is run against one face of one of the sheets forming the duplex web. All three of these webs are run together to provide a large mill roll 13. Preferably the web of paper coming off the paper roll 12 is slightly narrower than the duplex web. This web separates alternate layers of the duplex web in the mill roll so that each of these layers is insulated against each other.

After the mill roll 13 has been formed the ends are heat-sealed. One convenient means for doing this is to hold the ends of the roll against a hot plate. The contacting marginal ends of the insulated layers of thermoplastic material will each become heated and fused, the interleaved layer of paper preventing, because of its insulating effect, adjacent layers from sticking or fusing to each other. Other suitable means of heating these ends can be practiced but this method of bulk sealing is preferred. The ends of the roll can, for example, either be heated by means of a flame or they may be immersed in a bath of molten metal.

Another method of producing the insulating effect is to run two rolls 110 of thermoplastic material as a duplex web and similarly gather them in roll form as diagrammatically illustrated in Fig. 3. Before the webs come together there can adhesively be applied to opposite marginal edges of one of the webs 111 a stripe of a pigmented lacquer ink customarily employed in printing transparent sheets. Such lacquers contain non-thermoplastic ingredients which act as an insulating agent to prevent sticking together of adjacent sheets of the duplex web during the sealing operation. This can be accomplished by passing the sheet 111 across an etched roll 112 of an intaglio printing unit. The roll 112 revolves in a tank containing a bath of non-thermoplastic material 114. The roll is wiped by a conventional doctor blade 115. An impression roll 116 maintains the web 111 in contact with the printing roll 112. Thereafter the duplex web is again gathered into roll form as indicated at 113. While both modifications illustrate the gathering of the insulated web of duplex material in roll form, it will be obvious that it can be gathered into any suitable kind of a mass or bulk form as long as the edges to be sealed are in substantial edge alignment. For example, the web can continuously be folded upon itself and compactly squeezed together and heat applied to the ends in order marginally to seal adjacent layers of the duplex webs.

Any time after the ends of such a roll have properly been heat-sealed, a web running from such a roll can be cut into suitable lengths. This can be done immediately or even following periods of storage after such rolls have been sent to customers for whatever use they intend to make of tubes cut therefrom.

In Fig. 4 such a roll is diagrammatically illustrated in which the duplex web 11 and paper sheet are passed through a cutting device. The pieces of paper sheeting can be discarded and the remaining sealed tubes be used as containers after they are filled and the ends are suitably sealed.

The present invention has many advantages in that it is speedy in operation and accurate in that the ends of the roll can readily be held in alignment. Also, sheets of any conventional width can be run to form suitably sized mill rolls, and there is no limit on the length of tubes which can be cut from such a roll.

It will thus be seen that the objects hereinbefore set forth can readily and efficiently be attained, and since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. The method of bulk sealing, which comprises adhesively applying a non-thermoplastic insulating material to opposite longitudinal marginal edges of one side of a duplex web consisting of at least two layers of heat-sealable material, collecting said web in roll form with the insulating material spaced between each succeeding layer of said duplex web, and heat-sealing the ends of said roll, to unite contiguous marginal portions of the layers of said web to provide a single uncut continuous overlapping tube-forming roll.

2. The method of bulk sealing, which comprises applying a web of non-heat-sealable material against one sheet of a duplex web consisting of at least two layers of heat-sealable material, collecting said combined sheets in roll form, with the non-heat-sealable material separating succeeding layers of said duplex web, heat-sealing the ends of said roll, to unite contiguous marginal portions of the layers of said web to provide a single uncut continuous overlapping tube-forming roll, unwinding said roll as a continuous web, and cutting therefrom individual lengths of tubing.

3. A product of the kind described, which comprises layers of a continuous duplex web consisting of at least two layers of rubber hydrochloride in roll form with longitudinal edges thereof remaining exposed, successive layers of said web being separated from each other along opposite edges by insulation material, and the exposed edges of said successive layers being sealed together, to provide a single uncut continuous overlapping tube-forming web.

4. A product of the kind described comprising a compact mass of a longitudinally edge aligned continuous composite web consisting of at least two layers of heat-sealable material having insulation material disposed along opposite edges of a face of one of said webs, and said mass being sealed at its edge aligned ends to provide a single uncut continuous overlapping tube-forming web in roll form.

5. A product of the kind described comprising a roll of heat-sealable duplex web material consisting of at least two layers having a non-thermoplastic application of insulating material along opposite marginal edges of one side of said web and separating successive layers of said roll, and the ends of said roll being sealed to provide a single uncut continuous overlapping tube-forming web in roll form.

6. A product of the kind described comprising a roll of heat-sealable duplex web material consisting of at least two layers of rubber hydrochloride having a sheet of non-heat-sealable insulating material disposed against one sheet of said duplex web and separating successive layers of said roll, and the ends of said roll being sealed to provide a single uncut continuous overlapping tube-forming web of rubber hydrochloride roll material.

7. The method of bulk sealing, which comprises gathering in connected layers in roll form a continuous duplex web consisting of at least two layers of rubber hydrochloride, simultaneously gathering therewith a web of paper insulating material of substantially the same width and length as said duplex web so that the longitudinal edges of the gathered material remain exposed with successive layers of said web separated from each other, and sealing together the exposed edges of each end of said layer of said continuous web gathered in roll form, to unite contiguous marginal portions of the layers of said web to provide a single uncut continuous overlapping tube-forming web, separating said layers into a continuous web, and cutting tube lengths therefrom.

8. The method of bulk sealing, which comprises placing insulation material along opposite edges of one face of a composite web consisting of at least two lengths of heat-sealable material, collecting said web in roll form in edge alignment with the insulation material separating alternate portions of said composite web, and heat-sealing the edge aligned ends of said roll, to unite contiguous marginal portions of the layers of said web to provide a single uncut continuous overlapping tube-forming web.

WALTER C. CURTIS, Jr.

REFERENCES CITED

The following references are of record in the file of this patent:

UNITED STATES PATENTS

| Number | Name | Date |
| --- | --- | --- |
| 1,457,625 | Freydberg | June 5, 1923 |
| 1,848,776 | Godfrey | Mar. 8, 1932 |
| 2,224,017 | Gurwick | Dec. 3, 1940 |
| 2,232,062 | Gurwick | Feb. 18, 1941 |
| 2,232,640 | Schwartzman | Feb. 18, 1941 |
| 2,259,239 | Brown et al. | Oct. 14, 1941 |